United States Patent [19]

Koutsky

[11] 4,176,878

[45] Dec. 4, 1979

[54] ARMREST STRUCTURE

[75] Inventor: L. John Koutsky, Milan, Ill.

[73] Assignee: Sears Manufacturing Company, Davenport, Iowa

[21] Appl. No.: 899,193

[22] Filed: Apr. 24, 1978

[51] Int. Cl.² ............................................. A47C 13/00
[52] U.S. Cl. ...................................... 297/115; 297/411;
297/417
[58] Field of Search ................ 297/113, 115, 411, 417

[56] References Cited

U.S. PATENT DOCUMENTS

| Re. 19,721 | 10/1935 | Genung | 297/417 X |
|---|---|---|---|
| 153,332 | 7/1874 | Gould | 297/38 |
| 2,296,628 | 9/1942 | Coppock | 297/415 |
| 2,506,156 | 5/1950 | Long | 297/115 |
| 2,530,384 | 11/1950 | Faggen | 297/415 |
| 2,584,732 | 2/1952 | Okun | 297/415 |
| 2,660,228 | 11/1953 | Reinhold | 297/411 X |
| 2,902,085 | 9/1959 | Bahnson | 297/113 X |
| 3,161,076 | 12/1964 | Ferrara | 297/114 X |
| 3,168,346 | 2/1965 | Rei | 297/113 |
| 3,191,995 | 6/1965 | Shelton | 297/417 |
| 3,439,889 | 4/1969 | Karlsen | 297/416 X |
| 3,544,163 | 12/1970 | Krein | 297/417 |
| 3,779,600 | 12/1973 | Quackenbush | 297/417 |
| 3,807,799 | 4/1974 | Freedman | 297/417 |
| 3,880,466 | 4/1975 | Brennen | 297/417 |
| 3,886,611 | 6/1975 | Lammy et al. | 297/417 X |
| 3,909,063 | 9/1975 | Bonisch et al. | 297/113 |
| 3,967,851 | 7/1976 | Stier | 297/417 X |
| 4,097,088 | 6/1978 | Meiller | 297/115 X |

FOREIGN PATENT DOCUMENTS 581818 10/1946 United Kingdom ..................... 297/417

Primary Examiner—James C. Mitchell
Attorney, Agent, or Firm—Henderson & Sturm

[57] ABSTRACT

An armrest structure for a vehicle seat. The armrest structure includes a support attached to the side of the vehicle seat, an armrest, and an adjustment structure connecting the support and armrest. The armrest is movable vertically and, in the lowermost travel position, forms an enlargement of the seat portion of the vehicle seat. The armrest is pivotable on the adjustment structure into an upright position.

11 Claims, 9 Drawing Figures

ARMREST STRUCTURE

BACKGROUND OF THE INVENTION

This invention relates to seats and armrest structures employed with the seats. More particularly this invention is concerned with an armrest structure for a vehicle seat.

Armrest structures for seats usually are fixed in a generally horizontal disposition and at a particular vertical distance from the seat portion of the vehicle seat. While support for the arm, and lateral support for the body, of the seat occupant is provided in seats with such armrests, movement into and out of the seat is hindered. Furthermore, such seats have a reduced facility for comfortably accommodating occupants of different body types. Such problems become substantially magnified in vehicle seats where the environment of the seat increases the difficulty of providing a comfortable seat with ready access and adequate support for a variety of vehicle operators. The problem is most acute in the often crowded cabs of heavy commercial and off-the-road vehicles.

Attempts to address the aforementioned problems have resulted in development of armrests which, while having some vertical adjustment properties, rely on complex linkage structures which consume space. Such structures also would be exposed to fouling and damage in an off-the-road vehicle application. Other armrests have only a pivoting facility.

SUMMARY OF THE INVENTION

An armrest structure, for a vehicle seat, having a support member which is attached to the side of the vehicle seat. The support member has a guide structure formed therein. An adjustment structure is connected to the support member, having first and second members operable to alternately clamp and unclamp the support member, the adjustment structure being slidable along the guide when first and second members are not clamping the support. An armrest is pivotally attached to the adjustment structure. Movement of the adjustment structure effects vertical adjustment of the armrest with respect to the seat portion of the vehicle seat. Disposed at the lowest travel position, the armrest forms an enlargement to the seat portion. The armrest is pivotable to a position flush with or beyond the surface of the backrest portion of the vehicle seat.

It is an object of this invention to provide an armrest for a vehicle seat which supplies lateral support to the body of the vehicle operator.

It is another object of this invention to provide an armrest which is readily movable to a position flush with, or beyond, the surface of the backrest portion of a vehicle seat, thereby permitting easy access to and egress from the seat.

Also an object of this invention is the provision of an armrest which is adjustable to vary the distance between the armrest and the seat portion of the vehicle seat, thereby adapting the vehicle seat to the body type of the operator.

Still another object of this invention is to provide an armrest for a vehicle seat which is adjustable to a position flush with the surface of the seat portion of the vehicle seat, thereby providing a greater seating area and further adapting the vehicle seat to the operator.

A further object of this invention is to provide an armrest substantial portions of which are enclosed, thereby resulting in increased resistance to blows and to fouling.

Yet another object of this invention is the provision of an armrest which can be employed both with vehicle seats which are unitary in construction and with vehicle seats which have separate backrest and seat portions.

It is also an object of this invention to provide an armrest having a structure which conserves space yet is capable of achieving the aforementioned objects.

These objects and other features and advantages of this invention of an armrest structure will become readily apparent upon referring to the following description when taken in conjunction with the appended drawing.

BRIEF DESCRIPTION OF THE DRAWING

The armrest structure of this invention is illustrated in the drawing wherein.

DESCRIPTION OF THE PREFERRED EMBODIMENT

Figure 1:
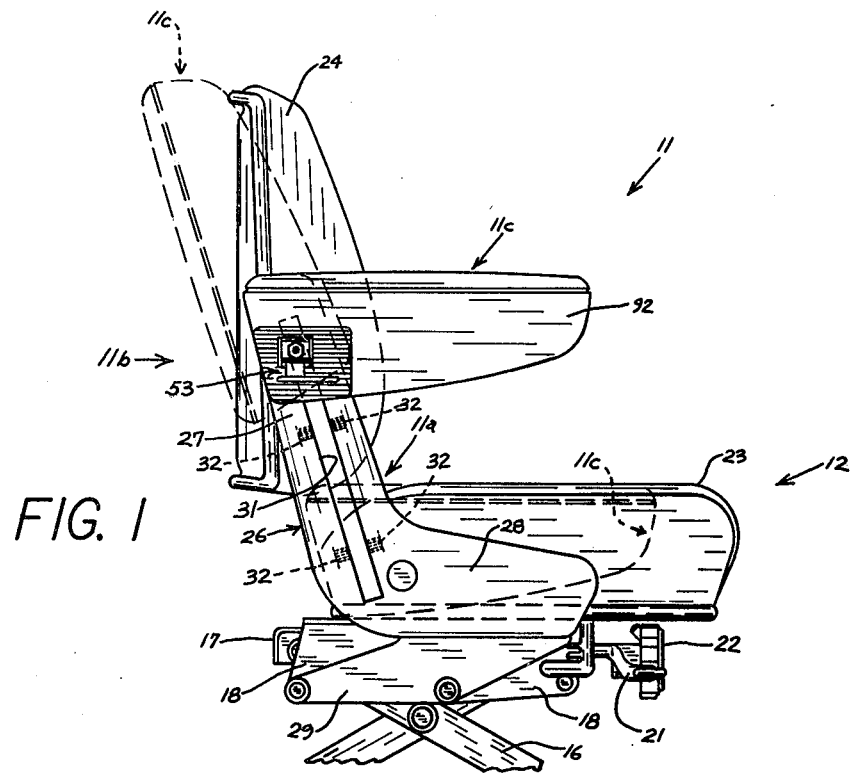
FIG. 1 is a fragmentary, side elevational view of the armrest structure in attachment with a vehicle seat, various positions of the armrest thereof being shown in dotted lines.

The armrest structure of this invention is shown generally at 11 in FIG. 1 in attachment with a vehicle seat 12. The vehicle seat 12 illustrated is attached to a vehicle (not shown) and includes a scissors linkage suspension 16. An upper housing member 17 is attached to the suspension 16 and carries the height adjustment linkage members 18. Height and weight adjustment control structures 21, 22 are attached to the upper housing 17. A seat portion 23 is attached to the linkage members 18, and a backrest portion 24 is connected to the seat portion 23. It is to be understood that the armrest structure 11 may be employed with vehicle seats different in construction from that illustrated at 12. For example, the suspension employed could be a parallelogram type; height and weight adjustment features might be omitted; and the seat portion could be unitary in structure rather than having two discrete members.

The armrest structure 11 of this invention more particularly includes a support portion 11a, a movable adjustment portion 11b and an armrest portion 11c. The support portion 11a includes right and left side brackets 26 (the right side bracket 26 being shown in FIGS. 1 and 3). Each bracket 26 includes a portion 27 upwardly extending with respect to the vehicle seat 12, a portion 28 forwardly extending and a portion 29 depending from portion 28. Portions 27, 28, 29 are attached to the backrest portion 24, seat portion 23 and linkage members 18 respectively, such as by bolts. The brackets 26 therefore interconnect members 18, 23, 24.

Each bracket 26 includes a flange 30 disposed about the periphery of portions 27, 28 and inwardly directed toward the seat 23 and backrest 24. A slot 31 is formed through the bracket 26 and extends along the longitudinal axis of the upwardly directed portion 27. A row of serrations 32 is cut into the inside surface of the bracket 26 on each side of the slot 31, the serrations 32 being normal to the longitudinal axis of the slot 31.

Figure 4:
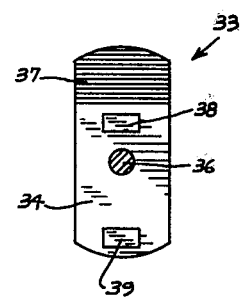
FIG. 4 is an enlarged side elevational, partly sectional view taken along line 4—4 in FIG. 3.
Figure 3:
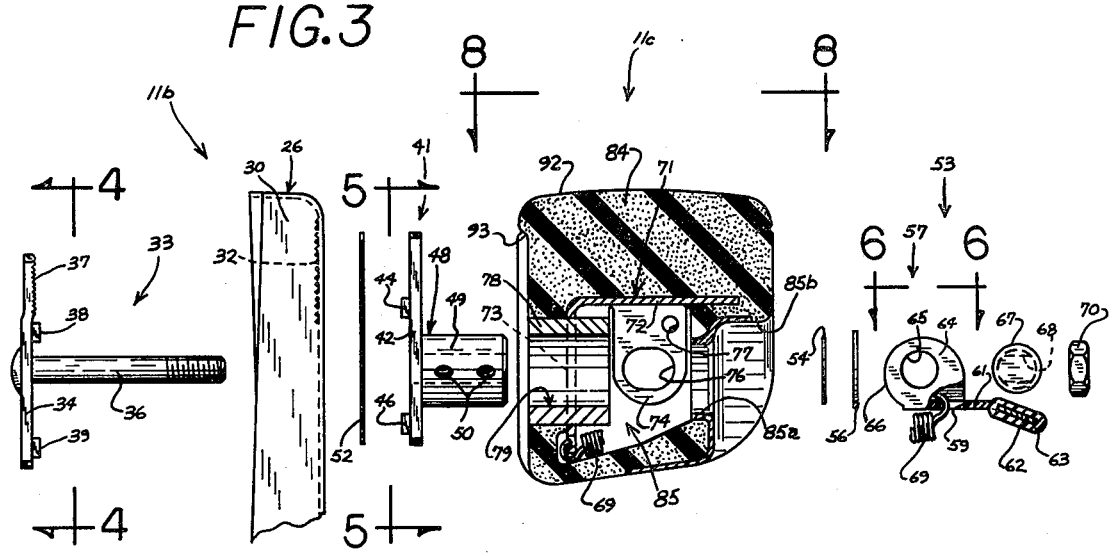
FIG. 3 is an enlarged exploded, fragmentary, partly sectional view of the armrest structure of this invention.

The movable adjustment portion 11b includes a first movable member or backup plate assembly 33 (FIGS. 3 and 4). The assembly 33 has an elongated plate 34. A bolt 36 extends from the center of, and is disposed normal to, the plate 34. Transverse serrations or dimples 37 are cut into the upper end of the plate 34. Upper and lower transverse extrusions 38, 39 are formed on the plate 34, extrusion 38 being disposed between the serrations 37 and bolt 36 and extrusion 39 being adjacent the lower end of plate 34. The bolt 36 and extrusions 38, 39 are aligned along the longitudinal axis of the plate 34, and, together with the serrations 37, extend from the same side of plate 34.

Figure 5:
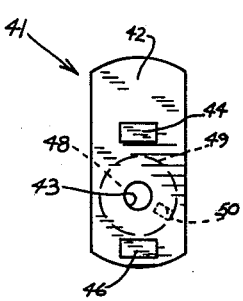
FIG. 5 is an enlarged side elevational view taken along line 5—5 in FIG. 3.

Adjustment portion 11b also includes a second movable member or pivot boss assembly 41 (FIGS. 3 and 5). The assembly 41 has an elongated plate 42. An aperture/bore 43 is formed through the plate 42, the bore 43 being transversely centered and disposed toward the lower end of the plate 42. Upper and lower transverse extrusions 44, 46 are formed, on, and extend to the same side of, the plate 42. The extrusions 44, 46 and bore 43 are disposed along the longitudinal axis of plate 42 the extrusions being on opposite sides of the bore 43. A cylindrical boss 48 extends perpendicularly from the side of plate 42 opposite the extrusions 44, 46. The bore 43 extends through, along the longitudinal axis of, the boss 48. A pivot bearing surface 49 is provided by th boss 48, and two longitudinally spaced, radially disposed threaded bores 50 are cut into pivot boss 48. Bolt stops 51 and a flat, rectangular spacer or bearing 52 are employed with assembly 41.

Figure 6:
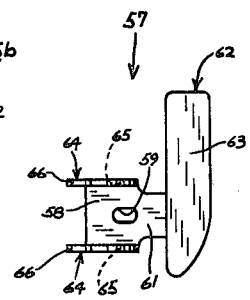
FIG. 6 is an enlarged top plan view taken along line 6—6 in FIG. 3.

The adjustment portion 11b further includes a cam handle assembly 53 (FIGS. 3 and 6). Smaller and larger diameter washers 54, 56 are employed. A cam handle 57 includes a flat transverse plate portion 58 having an aperture 59 formed therethrough. A handle extension 61 is attached to, and disposed to one side of, the transverse plate 58. A handle 62 is joined to the end of extension 61, the longitudinal axes of members 61, 62 being perpendicular. A plastic cap or dip coating 63 covers the handle 62. Joined normal to each end, and extending upwardly and to the same side, of transverse plate 58 are flanges 64. Aligned apertures 65 are formed through the flanges 64. The edges of the flanges 64 form curved cam surfaces 66. Each flange 64, when viewed from the side as in FIG. 3, has a horizontal dimension which is greater than its vertical dimension. An elongated pivot bolt 67 (FIGS. 3 and 8), with a transverse bore 68, and a spring 69 are also employed.

When the movable adjustment portion 11b is assembled (FIG. 8), the plate 34 is disposed adjacent the inwardly facing surface of the bracket 26. The extrusions 38, 39 and bolt 36 extend through the slot 31, and the serrations 37 are adjacent the rows of serrations 32. The plate 42 is disposed adjacent the outwardly facing surface of the bracket 26, the extrusions 44, 46 extending through slot 31. The spacer 52 is disposed between the bracket 26 and plate 42, the bolt 36 passing through a hole (not shown) in spacer 52 and through the bore 43. The bolt stops 51 are threaded into bores 50. The extrusions 38, 39, 44, 46 are staggered such that extrusions 44 and 46 are disposed above extrusions 38 and 39 respectively.

The handle assembly 53 is then attached, the small and then the large diameter washers 54, 56 being slipped over the bolt 36 and moved adjacent the extended end surface of the cylindrical boss 48. The pivot bolt 67 is passed through the aligned apertures 65; the bolt 36 is received through the bore 68, the cam surfaces 66 being disposed adjacent the washer 56; and one end of the spring 69 is made to engage the aperture 59. A nut 70 is threaded onto the extended end of the bolt 36. The adjustment portion 11b is then joined together and also mounted on support portion 11a.

Figure 8:
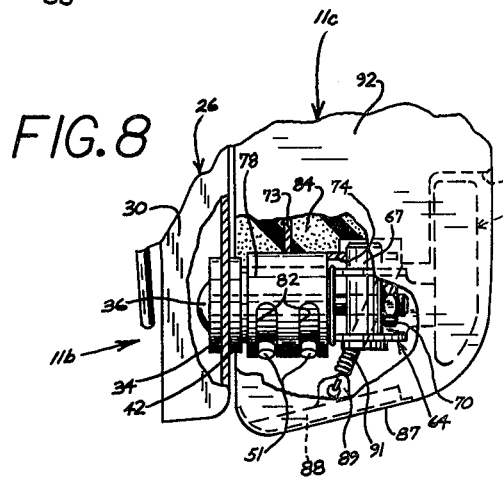
FIG. 8 is an enlarged, fragmentary, partially cut away top plan view, as along line 8—8 in FIG. 3, of the armrest structure of this invention.
Figure 7:
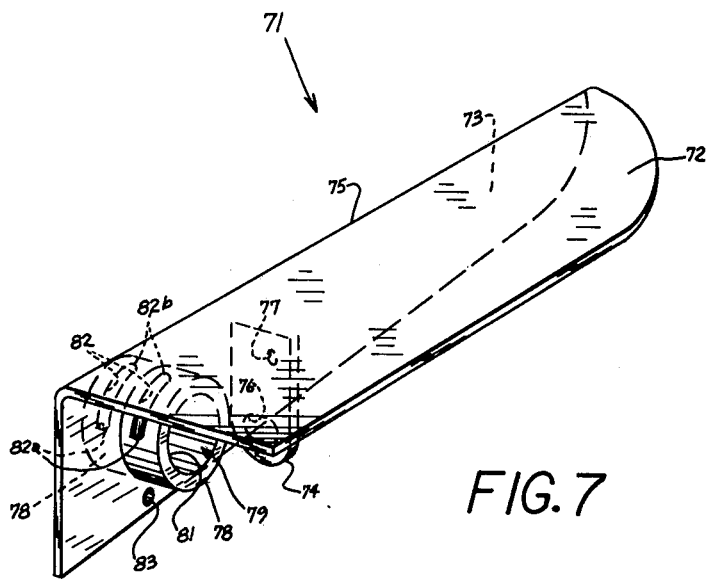
FIG. 7 is an enlarged rear perspective view of an interior support structure of the armrest.

The armrest 11c includes an interior support member 71. A right side armrest 11c and member 71 therefor are illustrated in FIGS. 3, 7 and 8. The member 71 includes horizontal and vertical plates 72, 73 joined along a longitudinal edge 75. The plates 72, 73 taper from the rear to the front. The member 71 therefore has an L-shaped cross-section which is not of a uniform dimension. The plate 73 extends to the side of plate 72 disposed away from the vehicle seat 12. A tab 74 (FIGS. 3 and 7) is disposed toward the rear, depends from the underside of plate 72 and is normal to both plates 72, 73. An elongated aperture 76, having a longitudinal axis normal to plate 73, is formed through, adjacent the lower end of, tab 74. A small aperture 77 is formed through the tab 74 adjacent plate 72. A cylindrical member 78 is fixed normal to the plate 73, extending to both sides of the plate 73, and a longitudinal bore 79 is formed through the member 78 and plate 73 thereby providing an inside pivot surface 81. Arcuate slots 82 (FIGS. 7 and 8) are formed through member 78 and spaced to opposite sides of the plate 73. An aperture 83 (FIGS. 3 and 7) is formed in the plate 73 below the cylindrical member 78.

Figure 9:
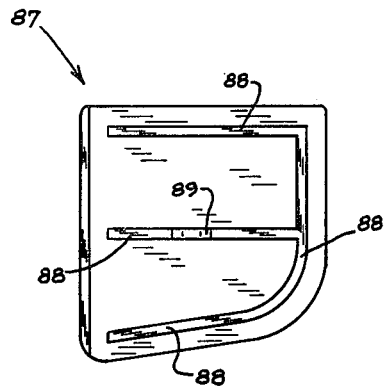
FIG. 9 is an enlarged elevational view of the cover plate of the armrest.

The armrest 11c also includes a foam structure 84 foamed about the interior support member 71 but not into the slots 82 or bore 79 of member 78. At the rear of the armrest 11c a pocket or compartment 85 is formed in the foam 84 adjacent the tab 74 and cylindrical member 78. The compartment 85 communicates with the bore 79 and slots 82 and opens, at 85a (FIGS. 3 and 8), to the side of the armrest 11c directed away from the seat 12. The compartment 85 also opens to the rear, and a cover plate 87 (FIGS. 8 and 9) is removably disposed over the rear opening. The inside surface of the cover plate 87 has reinforcement ribs 88 formed thereon, and an apertured tab 89 is joined to one of the ribs 88. A cover spring 91 engages the tab 89 and the aperture 77 thereby removably attaching the plate 87 to the armrest 11c. A cover 92 of a suitable plastic is attached to the exterior surface area of the foam 84.

The armrest 11c is joined to adjustment portion 11b during assembly of portion 11b. The armrest 11c is slipped onto the pivot boss assembly 41, the boss 48 being received into the bore 79 such that the pivot surfaces 49, 81 are juxtaposed and the threaded bores 50 aligned with slots 82, the bolt 36 projecting into compartment 85. The bolt stops 51 are then passed through the slots 82 and threaded into the bores 50. The handle assembly 53 is then attached as described hereinbefore.

The pivot bolt 67 extends through the elongated aperture 76 as well as through aligned apertures 65. The spring 69 engages at one end aperture 59 and at the opposite end aperture 83 of support member 71. When the asembly 53 is attached, handle extension 61 projects through opening 85a, and the handle 62 is disposed in an enlarged portion 85b of opening 85a. The cover plate 87 is attached last.

The materials for the armrest structure 11 are selected from appropriate steels or other metals and formed by well known metal forming techniques. Some parts, for example cover plate 87, may be formed from any suitable commercially available hard plastic. The cover 92 may be polyvinyl chloride and the foam 84 a polyurethane, polyether-type. The foam 84 can be poured in place in the cover 92 and around member 71.

Figure 2:
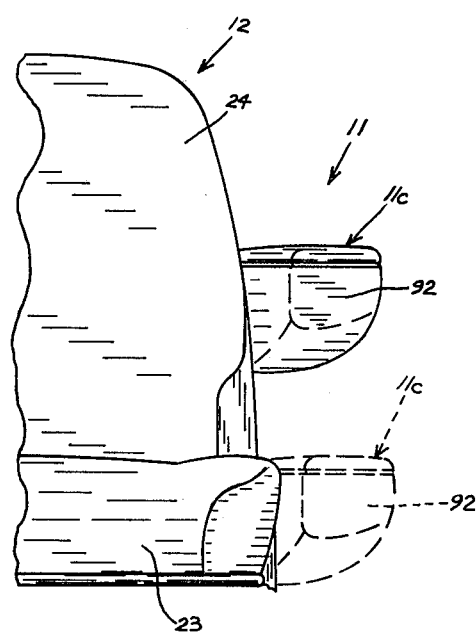
FIG. 2 is a fragmentary, front elevational view of the armrest structure attached to a vehicle seat, the dotted lines indicating an alternate position of adjustment of the armrest thereof.

As illustrated in FIGS. 1 and 2, the armrest structure 11 is adjustable such that the armrest 11c can be disposed in various positions with respect to the seat 12 as required. In FIG. 8 the armrest structure 11 is shown when the portion 11b bearing armrest 11c has locked against vertical movement and the armrest 11c has been pivoted to a horizontally disposed position. The spring 69 biases the cam handle 57 about the longitudinal axis of pivot bolt 67 downwardly and inwardly toward the seat 12 (clockwise as viewed in FIG. 3). The cam surfaces 66 increasingly press against the washer 56 as the cam handle 57 rotates, the pivot bolt 67 being moved along the bolt 36 away from the vehicle seat 12. The nut 70 is threaded onto the bolt 36 such that when the cam handle 57 is disposed in the position illustrated in FIGS. 3 and 8 the pivot bolt 67 is pressed against the nut 70. Pressure of the cam surfaces 66 through the washers 56, 54 against the cylindrical boss 48 causes the plate 42 to move along the bolt 36 against the side bracket 26. Pressure of the pivot bolt 67 against nut 70 causes the plate 34 to move against the side bracket 26. The serrations 37 engage the rows of serrations 32. The backup plate assembly 33 and pivot boss assembly 41 thereby clamp the bracket 26, fixing the armrest 11c at a particular vertical disposition with respect to the seat portion 23.

When it is desired to adjust the vertical position of the armrest 11c, the operator engages the handle 62 with his fingertips and pulls upwardly, rotating the cam handle 57 about the longitudinal axis of the pivot bolt 67 (counterclockwise as viewed in FIG. 3). The pressure of the cam surfaces 66 against washer 56 lessens, and the pivot bolt 67 becomes slidable along bolt 36 away from nut 70 toward washer 56. An end of the pivot bolt 67 travels within the elongated aperture 76. The pivot boss assembly 41 moves along bolt 36 away from bracket 26. The backup plate assembly 33 moves such that the plate 34 is disposed away from the bracket 26, the serrrations 37 disengaging from the rows of serrations 32. The assemblies 33, 41 thereby unclamp the bracket 26, and the adjustment portion 11b, bearing the armrest 11c, is then slidable with respect to bracket 26. The operator, while pulling the handle 62 upwardly with his fingertips, grasps the foam portion 84 with the rest of his hand and moves the armrest 11c and portion 11b along the slot 31, the extrusions 38, 39, 44, 46 and bolt 36 acting to guide the movement. When the armrest 11c and portion 11b are vertically positioned as desired, the operator releases the handle 62, and the spring 69 causes the portion 11b to gain tightly grasp bracket 26, the armrest 11c becoming secured thereby in the new position. The armrest 11c is shown in solid lines in FIGS. 1 and 2 at the upper limit of vertical travel and in dotted lines at the lower limit of travel.

The armrest 11c is pivotable upon the adjustment portion 11b. When the armrest 11c is horizontally disposed (solid lines FIG. 1), the bolt stops 51 engage the rear ends 82a of the slots 82, as shown in FIG. 8. When the armrest 11c disposed in its upright position (dotted lines FIG. 1), the bolt stops 51 engage the front ends 82b of slots 82. The operator grasps the armrest 11c, but not the handle 62, and pulls upwardly, or pushes downwardly, to pivot the armrest 11c, the pivot surface 81 of member 78 rotating over pivot surface 49 of boss 48. The bolts 51 traveling within slots 82 guide the pivoting movement. The tab 74 acts on bolt 67 causing the cam handle 57 and bolt 67 to rotate about bolt 36, thereby maintaining a constant orientation with respect to the armrest 11c during pivoting movement. Depressed area 93 (FIG. 3) accommodates plate 42 when the armrest 11c is pivoted.

Vertical adjustment of the armrest 11c adapts the seat 12 to different vehicle operators. The armrest 11c when disposed at the lower limit of vertical travel forms an enlargement of the seat portion 23. By providing greater seating area the vehicle seat 12 is thereby adjusted to give greater comfort to a larger vehicle operator. The armrest 11c can provide desirable lateral support to the vehicle operator, yet, when disposed in the upright position, enable the operator to easily take his postition in the seat 12 or vacate the seat 12. This feature is particularly valuable in crowded vehicle cabs where, because of lack of space, it might otherwise be very difficult for an operator to position himself in a seat having lateral supports. The general compactness of the armrest structure 11 conserves space, again a feature particularly valuable with regard to commercial or off-the-road vehicle cabs. The movable members of the armrest structure 11 are shielded from blows, being primarily disposed to the inside of bracket 26 and within compartment 85, yet ready access is provided, as through the cover plate 87, for assembly and repair. The bracket 26 may connect discrete seat and backrest portions, as in the seat 12 illustrated herein, or may provide additional side support for a unitary seat structure.

Although a preferred embodiment has been disclosed herein, it is to be remembered that various modifications and alternate constructions can be made thereto without departing from the full scope of the invention, as defined in the appended claims.

I claim:

1. Armrest structure for a vehicle seat having a seat portion and a backrest portion, comprising:
   upwardly elongated guide means disposed closely adjacent to the backrest portion;
   an adjustment portion carried by the guide means for selective movement of said adjustment portion upwardly and downwardly along the guide means, said adjustment portion including means providing a transverse pivot means;
   means for selectively securing the adjustment portion to the guide means at varying elevations relative to the seat portion;
   fore-and-aft armrest means having front and rear end portions and having its rear end portion mounted on said pivot means for arcuate swinging thereof relative to the adjustment portion to extend selectively either forwardly from the pivot means or upwardly from the pivot means generally in the transverse plane of the backrest portion and also for bodily movement of said armrest means in unison with the adjustment means as the latter is moved upwardly and downwardly along the guide means;

and stop means cooperative between the armrest means and the adjustment means for limiting downward swinging movement of the armrest means to a forwardly extending position, whereby the armrest means, while extending forwardly, is capable of upward and downward swinging movement of the armrest means to a forwardly extending position, whereby the armrest means, while extending forwardly, is capable of upward and downward movement with the adjustment portion among several travel positions at selected elevations above the seat portion while at the same time being freely swingable arcuately about the pivot means upwardly from and downwardly to the selected travel position irrespective of the selected position of the adjustment portion.

2. The armrest structure of claim 1, in which:
the guide means includes an elongated slot; and
the adjustment portion includes projections receivable in the slot to limit fore-and-aft displacement and rocking of the adjustment portion relative to the guide means.

3. The armrest structure of claim 1, in which:
the means for securing the selected positions of the adjustment portion along the guide means is coaxial with the transverse pivot means.

4. The armrest structure of claim 3, in which:
the transverse pivot means is tubular; and
the securing means includes an element passing coaxially through said tubular pivot means.

5. The armrest structure of claim 4, in which:
the securing means includes a control member axially externally of the tubular pivot means.

6. The armrest structure of claim 5, in which:
the rear end portion of the armrest means includes a compartment receivable of the pivot means and the coaxial securing means element.

7. The armrest structure of claim 6, in which:
said compartment opens to the rear of the armrest means;
and a removable cover is provided for normally closing the rear of said compartment.

8. The armrest structure of claim 1, in which:
the guide means is elongated downwardly in the vicinity of the seat portion to enable the adjustment portion, together with the armrest means in a selected travel position, to move downwardly to a position in which the armrest means is substantially at the level of the seating surface of said seat portions.

9. The armrest structure of claim 1, in which:
the rear end portion of the armrest means includes a compartment receiving the transverse pivot means and at least a part of the adjustment portion.

10. The armrest structure of claim 1, in which:
the transverse pivot means includes a cylindrical member;
the mounting of the armrest means on the pivot includes a bearing sleeve surrounding said cylindrical member; and
the stop means includes cooperative interengageable portions respectively on said said sleeve and member.

11. The armrest means of claim 10, in which one of said cooperative portions is an arcuate, partly peripheral slot in the sleeeve and the other cooperative portion is a radial projection on the cylindrical member extending into said slot.

* * * * *